United States Patent [19]
Jentjens et al.

[11] Patent Number: 6,105,751
[45] Date of Patent: Aug. 22, 2000

[54] DEVICE FOR TRANSPORTING OBJECTS

[75] Inventors: Gregorius Andre Christianus Maria Jentjens, Veghel; Wilhelmus Antonius Maria Ilmer, Raamsdonksveer, both of Netherlands

[73] Assignee: Vanderlande Industries Nederland B.V., Veghel, Netherlands

[21] Appl. No.: 09/147,786

[22] PCT Filed: Sep. 3, 1997

[86] PCT No.: PCT/NL97/00506

§ 371 Date: May 26, 1999

§ 102(e) Date: May 26, 1999

[87] PCT Pub. No.: WO98/09894

PCT Pub. Date: May 12, 1998

[30] Foreign Application Priority Data

Sep. 6, 1996 [NL] Netherlands ............................ 1003975

[51] Int. Cl.[7] ................................................ B65G 47/26
[52] U.S. Cl. ............................................ 198/435; 198/592
[58] Field of Search ................................ 198/435, 463.3, 198/592

[56] References Cited

U.S. PATENT DOCUMENTS

| | | | |
|---|---|---|---|
| 3,580,141 | 5/1971 | Richter ........................................... | 93/8 |
| 4,284,187 | 8/1981 | Kramer et al. ............................ | 198/435 |
| 4,541,824 | 9/1985 | Muller ........................................ | 493/29 |
| 5,203,393 | 4/1993 | Malow et al. ............................ | 198/369 |
| 5,427,223 | 6/1995 | Van Den Goor . | |
| 5,435,429 | 7/1995 | Van Den Goor . | |
| 5,590,995 | 1/1997 | Berkers et al. . | |
| 5,657,858 | 8/1997 | Van Den Goor . | |
| 5,667,054 | 9/1997 | Van Den Goor . | |
| 5,692,593 | 12/1997 | Ueno et al. ........................... | 198/369.2 |
| 5,695,042 | 12/1997 | Van Der Burgt et al. . | |
| 5,715,930 | 2/1998 | Hogendamp ............................ | 198/435 |
| 5,826,695 | 10/1998 | Van Den Goor . | |
| 5,826,704 | 10/1998 | Van Den Goor . | |
| 5,839,570 | 11/1998 | Vertogen et al. . | |
| 5,909,796 | 6/1999 | Soldavini ............................... | 198/369.2 |
| 5,909,797 | 6/1999 | Van Den Goor . | |
| 5,944,171 | 8/1999 | Vertogen et al. . | |

OTHER PUBLICATIONS

U.S. Ser. No. 09/210,805, filed Dec. 15, 1985, pending.
U.S. Ser. No. 09/147,786, filed Mar 8, 1999, pending.
U.S. Ser. No. 09/392,141, filed Sep. 9, 1999, pending.

*Primary Examiner*—Joseph E. Valenza
*Assistant Examiner*—Rashmi Sharma
*Attorney, Agent, or Firm*—Oblon, Spivak, McClelland, Maier & Neustadt, P.C.

[57] ABSTRACT

A conveyor for transporting objects. The vertically adjustable end of the first conveyor is positioned near the vertically adjustable ends of at least two further conveyors positioned one above the other. In a first position, the end of the first conveyor joins the end of one of the further conveyors. In a second position, the end of the first conveyor joins the end of the other of the further conveyors. The vertically adjustable ends of the conveyors are interconnected by means of a flexible connecting element including two parts extending from a guide mechanism in the direction of the ends of the conveyors. One part is connected to the first conveyor and the other part is connected to the further conveyors.

4 Claims, 2 Drawing Sheets

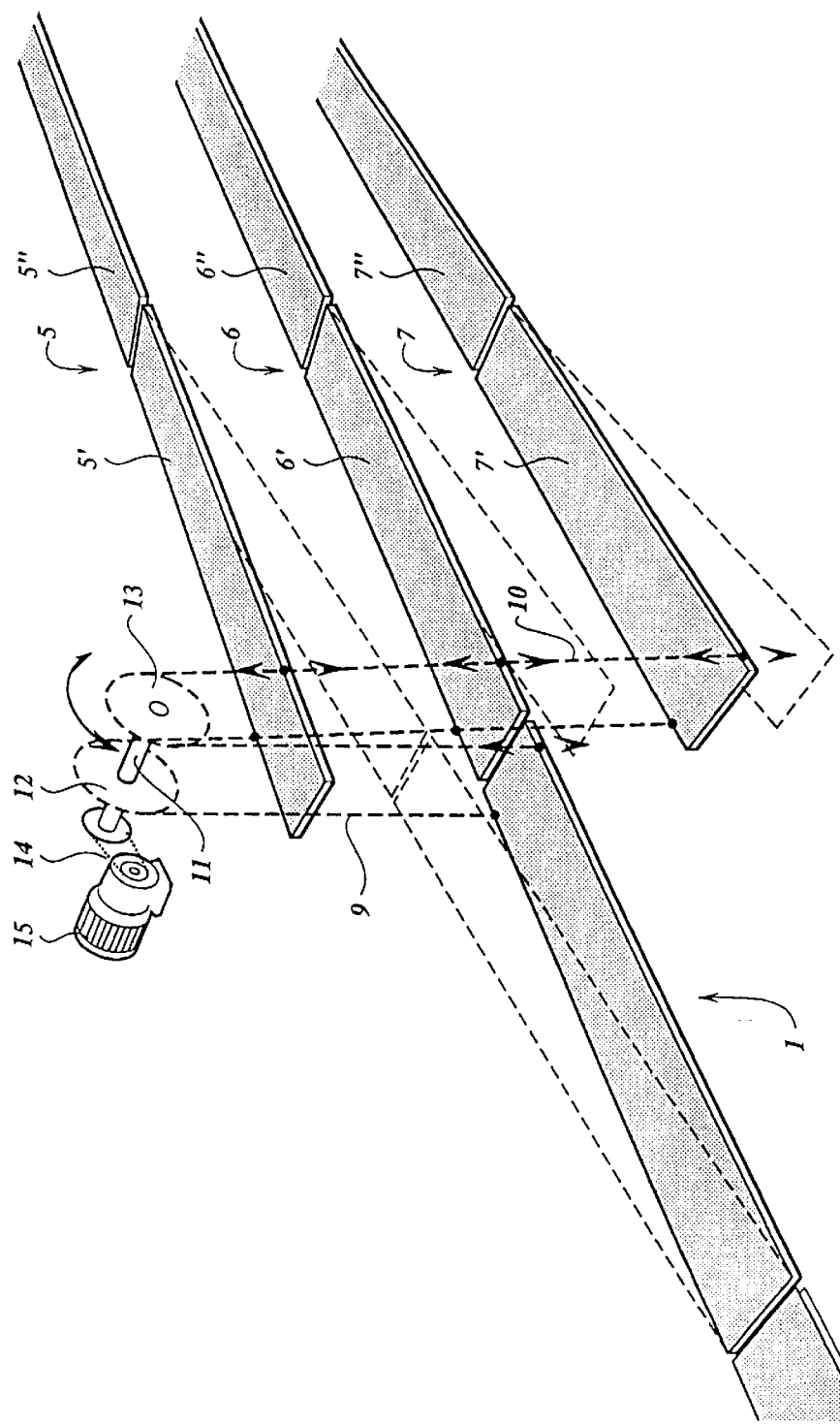

DEVICE FOR TRANSPORTING OBJECTS

BACKGROUND OF THE INVENTION

1. Field of the Invention

The invention relates to a device for transporting objects comprising a first conveyor, a vertically adjustable end of which is positioned near vertically adjustable ends of at least two further conveyors positioned one above the other, all this in such a manner that in a first position of said conveyors the end of said first conveyors joins the end of one of said further conveyors, and that in a second position of said conveyors the end of said first conveyor joins the end of another one of said further conveyors.

2. Discussion of the Background

Such devices are known per se (e.g. NL 6604786). The vertically adjustable ends of the conveyors are thereby connected to a complicated and heavy crank-connecting rod mechanism, which takes up a relatively great deal of space.

SUMMARY OF THE INVENTION

The object of the invention is to provide a device of this kind, wherein the vertically adjustable ends of the conveyor can be adjusted in vertical direction by simple and light means.

According to the invention this objective can be accomplished in that the vertically adjustable ends of said conveyors are interconnected by means of a flexible connecting element, which comprises two parts extending from a guide mechanism positioned above the vertically adjustable ends of the conveyors in the direction of the ends of said conveyors, whereby one part is connected to said first conveyor and the other part is connected to said further conveyors.

When using the construction according to the invention the vertically adjustable ends of the conveyors can be interconnected in a simple manner by means of one or more flexible connecting elements, such as chains, cables or the like, whereby one part will move down while the other moves up, and vice versa, if said connecting element is being moved by a suitable drive mechanism, whereby the ends of the conveyors connected to said parts will move up and down with said parts.

In an advantageous embodiment of the invention said device comprises three further conveyors positioned one above the other, whereby said first conveyors extends at least substantially in line with the middle one of said three conveyors when occupying a central position, and whereby said first conveyor slopes upwards or downwards in the direction of the upper or the lower one of said three conveyors when occupying two different positions.

In this manner a particularly efficient device can be obtained, by means of which objects supplied via a conveyor can be selectively delivered to any one of three conveyors positioned one above the other, or by means of which objects supplied via three conveyors can be discharged via one conveyor. Such a device of comparatively simple construction makes it possible to realise an effective handling in a limited amount of space of objects to be handled in warehouses or the like, for example.

BRIEF DESCRIPTION OF THE DRAWINGS

The invention will be explained in more detail hereafter with reference to the accompanying diagrammatic Figures.

FIG. 2 diagrammatically shows the arrangement of the conveyors with a drive mechanism for moving the vertically adjustable ends of said conveyors in vertical direction.

DETAILED DESCRIPTION OF THE PREFERRED EMBODIMENTS

Figure 1:
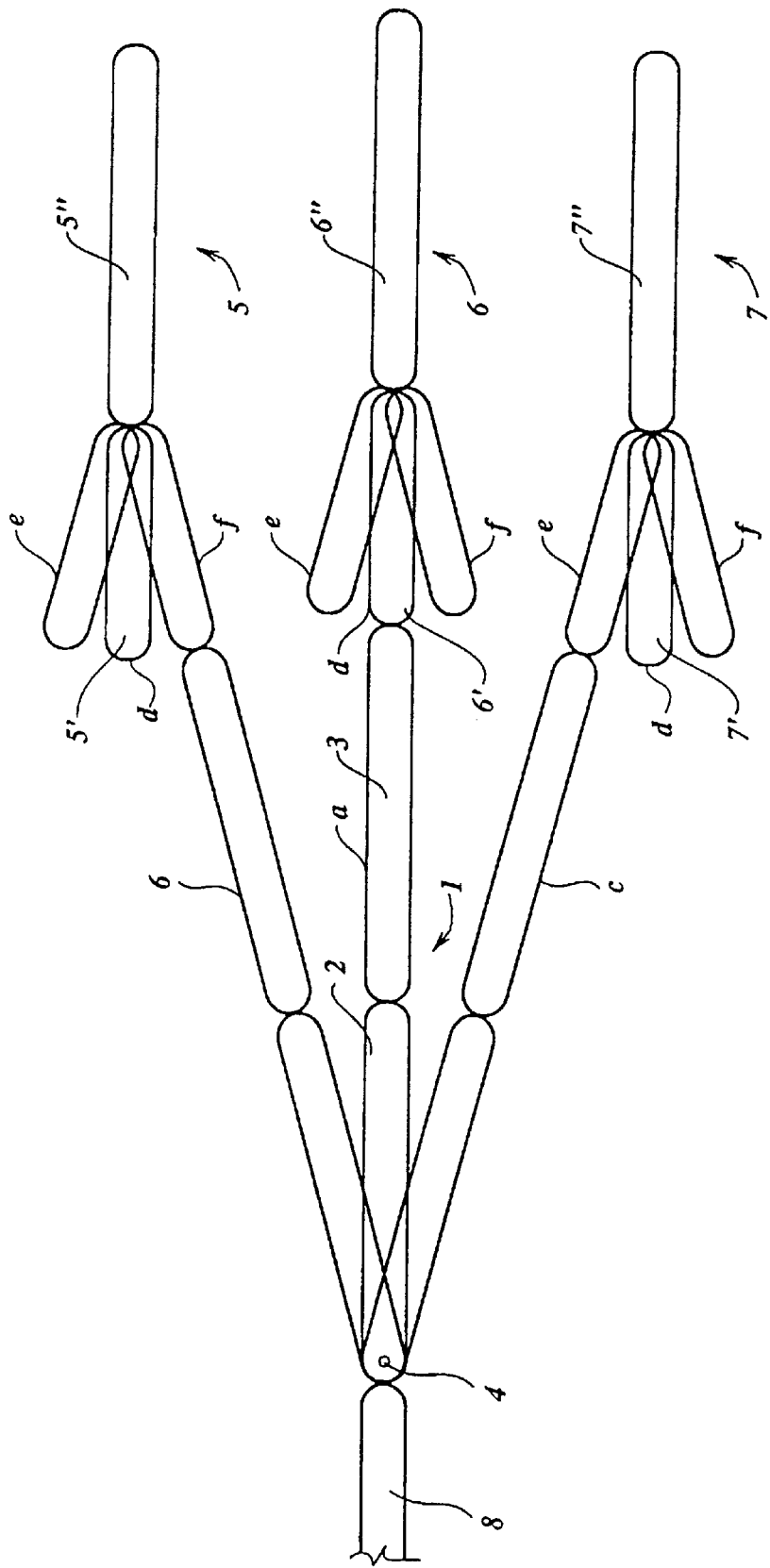
FIG. 1 diagrammatically shows an arrangement of a first conveyor in three positions, which conveyor co-operates with three conveyors positioned one above the other, which are likewise shown in three possible positions.

The device shown in FIG. 1 comprises a first conveyor 1, which is made up of two aligned conveyor belts 2 and 3 in the illustrated embodiment. The first conveyor, which is made up of conveyor belts 2 and 3, can be pivoted upwards about a pivot pin 4 located near the end of conveyor belt 2 remote from conveyor belt 3, from a central position a, in which the two conveyors belts 2 and 3, which are in line in the illustrated embodiment, take up a substantially horizontal position, to a position b, in which the aligned conveyor belts 2 and 3 slope upwards, and a position c, in which the aligned conveyor belts 2 and 3 slope downwards.

The device furthermore comprises three conveyors 5, 6 and 7 positioned one above the other, which are built up of two adjoining conveyor belts 5', 5''', 6', 6'' and 7', 7'' respectively in the illustrated embodiment.

As will furthermore be apparent from FIG. 1, the conveyor belts 5', 6', 7' can be pivoted about pivot pins located near conveyor belts 5'', 6'', 7'', from a central position d, in which conveyor belts 5', 6', 7' extend at least substantially horizontally, to a downwardly sloping position f and an upwardly sloping position e.

When conveyor belts 5', 6' and 7' extend horizontally, also conveyor 1 will take up a horizontal position, so that conveyors 1 and 6 will be in line and objects can thus be transferred from conveyor 1 to conveyor 6 or from conveyor 6 to conveyor 1, depending on the selected use of the device.

When conveyor belts 5', 6', 7' are pivoted to the upwardly sloping position e, conveyor 1 will be pivoted to the downwardly sloping position c, all this in such a manner that conveyor 1 is at least substantially in line with conveyor belt 7', so that objects to be transported can be transferred from conveyor 1 to conveyor 7, or vice versa.

When conveyor belts 5', 6', 7' are pivoted to the downwardly sloping position f, conveyor 1 will be pivoted to the upwardly sloping position b, so that conveyor 1 will join conveyor belt 5' of conveyor 5, and objects can thus be transferred from conveyor 1 to conveyor 5, or vice versa.

Of course it is possible to connect further transport means 8 to the ends of conveyors 1 and conveyors 5–7 that face away from each other, as is diagrammatically indicated on the left in FIG. 1.

Although the use of conveyor belts is mentioned in the above description, it will be apparent that also other types of conveyors may be used, for example roller conveyors, whether or not in combination with belt conveyors.

Furthermore conveyors 1, 5, 6 and 7 may be built up of more or of fewer parts than is shown in FIG. 1.

The mechanism shown in FIG. 2 may be used efficiently for moving the opposite ends of conveyors 1 and 5–7 in vertical direction. In this Figure parts that correspond with parts shown in FIG. 1 are indicated by the same numerals as in FIG. 1.

As is shown in FIG. 2, the ends of two flexible connecting elements 9 and 10, which are for example made up of cables or of chains, are connected to the vertically movable end of conveyor 1. The parts of connecting elements 9 and 10 that connect to conveyor 1 extend upwards in the direction of two pulleys 12 and 13 mounted on a shaft 11, which form a guide mechanism, and from which further parts of said flexible connecting elements extend downwards, said further parts being coupled to vertically adjustable ends of conveyor belts 5', 6' and 7' facing towards conveyor 1.

Shaft 11 can be rotated via a transmission mechanism 14 by means of a motor 15. It will be apparent that when shaft 11 is rotated in clockwise direction, seen in FIG. 2, the vertically movable end of conveyor 1 will move upwards and the vertically movable ends of conveyor belts 5', 6' and 7' will move downwards. Conversely, when shaft 11 is rotated in anti-clockwise direction, the vertically movable end of conveyor 1 will move downwards and the ends of conveyor belts 5', 6' and 7' facing towards said first conveyor will move upwards.

It will be apparent that in this manner an effective movement of the facing ends of the vertically adjustable conveyors can be effected by means of a drive and guide mechanism which may be of compact and light construction.

What is claimed is:

1. A device for transporting objects comprising a first conveyor, a vertically adjustable end of which is positioned near vertically adjustable ends of at least two further conveyors positioned one above the other, all this in such a manner that in a first position of said conveyors the end of said first conveyor joins the end of one of said further conveyors, and that in a second position of said conveyors the end of said first conveyor joins the end of another one of said further conveyors, characterized in that the vertically adjustable ends of said conveyors are interconnected by means of a flexible connecting element, which comprises two parts extending from a guide mechanism positioned above the vertically movable ends of the conveyors in the direction of the ends of said conveyors, whereby one part is connected to said first conveyor and the other part is connected to said further conveyors.

2. A device according claim 1, characterized in that said device comprises three further conveyors positioned one above the other, whereby said first conveyor extends at least substantially in line with the middle one of said three conveyors when occupying a central position, and whereby said first conveyor slopes upwards and downwards in the direction of the upper or the lower one of said three conveyors when occupying two different positions.

3. A device according to claim 1, characterized in that said flexible connecting element is carried over a pulley positioned above the vertically movable ends of the conveyors.

4. A device according to claim 2, characterized in that said flexible connecting element is carried over a pulley positioned above the vertically movable ends of the conveyors.

* * * * *

UNITED STATES PATENT AND TRADEMARK OFFICE
CERTIFICATE OF CORRECTION

PATENT NO. : 6,105,751

DATED : August 22, 2000

INVENTOR(S): Gregorious A.C.M. JENTJENS, et al.

It is certified that an error appears in the above-identified patent and that said Letters Patent is hereby corrected as shown below:

On the Title Page, Item [87] the PCT Publication Data is incorrect. It should read as follows:

[87] PCT Pub. No.: WO98/09894

PCT Pub. Date: March 12, 1998

Signed and Sealed this

Twenty-fourth Day of April, 2001

Attest:

NICHOLAS P. GODICI

Attesting Officer

Acting Director of the United States Patent and Trademark Office